(No Model.) 3 Sheets—Sheet 1.

W. KOCH.
STOP DEVICE FOR ADDING AND REGISTERING WHEELS.

No. 398,627. Patented Feb. 26, 1889.

Attest:
A. N. Jesbera
E. M. Watson

Inventor:
William Koch
By David A. Burr
Atty.

(No Model.) 3 Sheets—Sheet 3.

W. KOCH.
STOP DEVICE FOR ADDING AND REGISTERING WHEELS.

No. 398,627. Patented Feb. 26, 1889.

Attest:
A. N. Jesbera
E. M. Watson

Inventor:
William Koch
By David A. Burr
Atty.

UNITED STATES PATENT OFFICE.

WILLIAM KOCH, OF NEW YORK, N. Y.

STOP DEVICE FOR ADDING AND REGISTERING WHEELS.

SPECIFICATION forming part of Letters Patent No. 398,627, dated February 26, 1889.

Application filed September 25, 1888. Serial No. 286,333. (No model.)

*To all whom it may concern:*

Be it known that I, WILLIAM KOCH, of the city, county, and State of New York, have invented certain new and useful Improvements in Devices for Controlling the Movements of Adding and Registering Wheels and other Pawl-Actuated Mechanism; and I do hereby declare that the following is a full and exact description thereof, reference being had to the accompanying drawings, and to the letters of reference marked thereon, making a part of this specification, in which—

Figure 1:
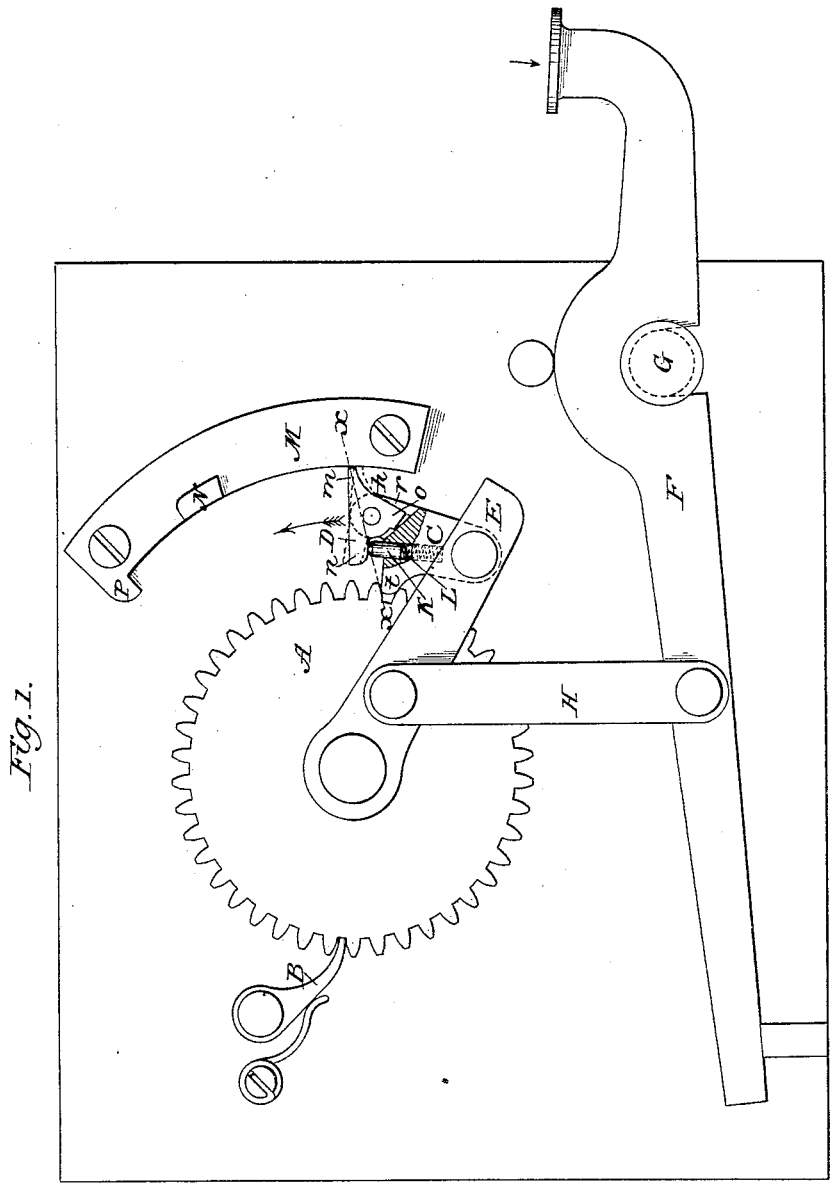
Figure 2:
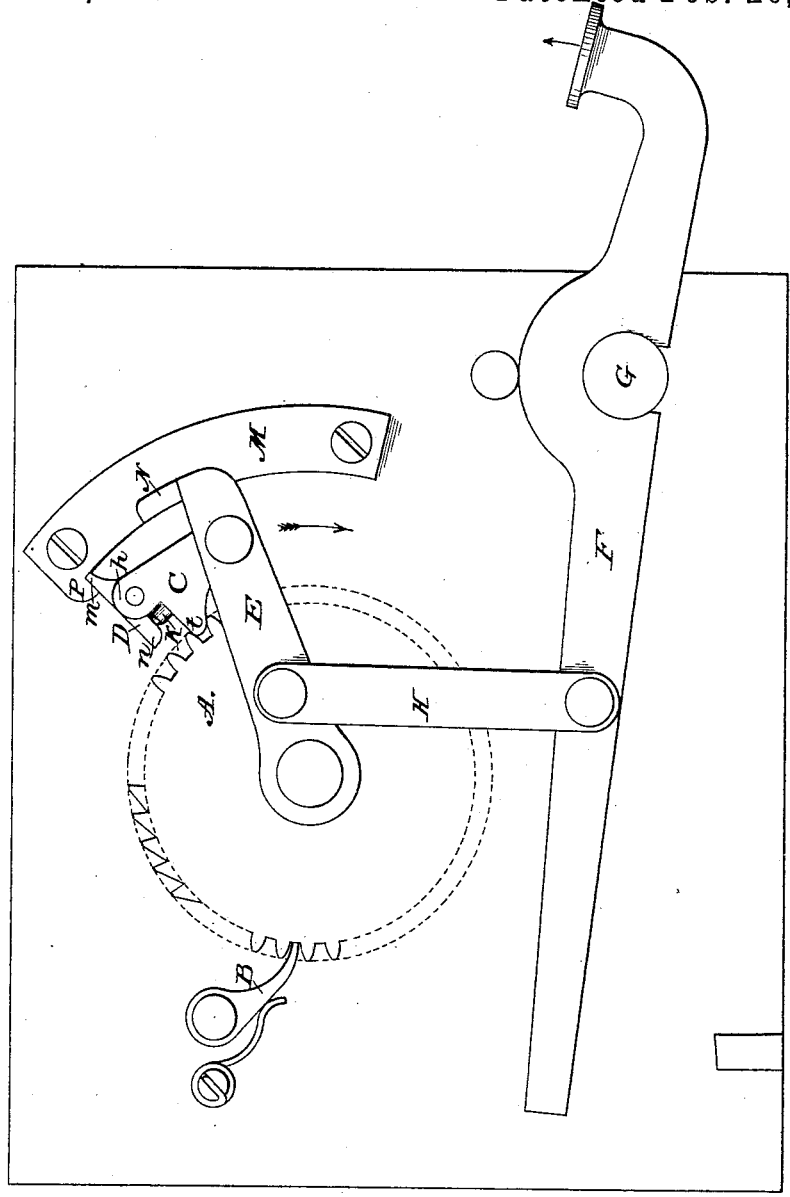

Figure 1 is a view in elevation of a toothed wheel actuated by my improved friction-pawl with the pawl in its first or normal position; Fig. 2, a similar view showing the position of the parts when the pawl has completed its stroke; and Fig. 3, the same, showing the pawl as moving in return to its first position.

The object of my invention is to positively arrest the movement of a toothed wheel actuated by a pawl at the instant the stroke of the pawl is completed, and also prevent the wheel during the stroke of the pawl from moving more rapidly than the pawl, so as to prevent thereby the overrunning of the registering, numbering, or adding wheels actuated by said toothed wheel and insure absolute accuracy in their movements.

In the accompanying drawings, A represents a toothed wheel, which may constitute the master-wheel in a train of adding or registering wheels; B, the pawl by which its reverse movement is prevented, and C the pawl by which the wheel is actuated.

The pawl C is pivoted in the customary manner upon an arm, E, swinging upon the axis of the wheel as its pivotal center, and may be actuated by any of the customary means—as, for example, by a key-lever, F, oscillating upon a shaft or pin, G, and coupled to the arm E by a pivoted link, H, as shown in the drawings, so that a depression of the outer end of the key-lever will cause the pawl-arm to move in the opposite direction, carrying the wheel A with it. The tooth $t$ of the pawl C is so shaped that it will drop fully between the interdental notches of the wheel A, so as to take firm hold of the wheel without preventing the necessary free reverse movement of the pawl C.

To enforce the hold of the pawl C upon the wheel as it carries it forward, and to prevent the wheel slipping ahead of the pawl by reason of the greater momentum of the wheel acquired under a very sharp quick movement of the pawl, a dog, D, is pivoted upon an extension, $h$, of the front end of the pawl. This dog D is formed substantially with three arms, $m$, $n$, and $o$. One of these arms, $m$, projects outwardly from the end of the pawl in a line which, when the pawl is in its normal position, will be radial with the axis of the wheel. The second arm, $n$, projects inwardly in a right line with the first and parallel with the outer face of the tooth $t$ of the pawl. The third arm, $o$, projects at a right angle with the first two on the opposite side of the pivot on which the dog turns, in manner to strike against the inner wall of the recess $r$, (see Fig. 1 and dotted lines, Fig. 3,) in which the dog is pivoted, and prevent thereby the inner arm, $n$, from swinging outward beyond its normal radial position, as described, while it is left free to swing inwardly.

A pin, K, actuated by a spring, L, (see Fig. 1 and dotted lines, Fig. 3,) is inserted in the end of the pawl C under the end of the arm $n$, to bear outwardly against said arm and automatically carry and maintain it in its normal position, as shown in Figs. 1 and 2.

A bar, M, having an inner curved face forming an arc having the axis of the wheel as its center, is fixed to the casing or frame of the machine in position to be in frictional contact with the outer end of the arm $m$ of the dog D during the entire forward stroke of the pawl, this frictional contact being enforced by the stress of the spring L. The pivot of the dog D is so adjusted with reference to the end of the tooth $t$ of the pawl and the outer end of the arm $m$ that the pivot shall be somewhat inside of a straight line, $x\,x$, drawn from the tooth $t$ to the end of the arm $m$, as shown in Fig. 1, when said arm is normally in contact with the curved face of the bar M, so as to form thereby in effect a knee or toggle-joint in connection therewith.

Figure 3:
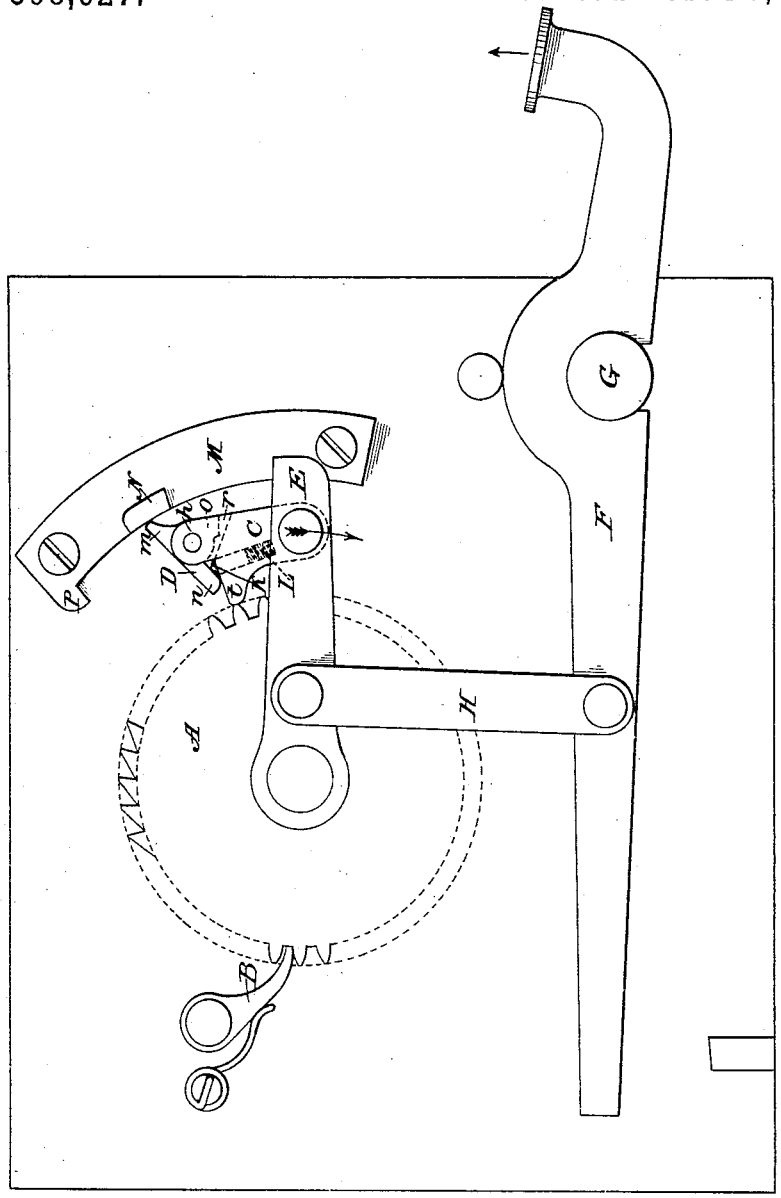

By reason of this adjustment, if the resistance offered to the movement of the end of the arm $m$ increases, as will be the case when the rapidity of its movement is increased, and the arm is consequently swung back more or less from its normal position, as illustrated in dotted lines in Fig. 1, its pressure against the bar M will be increased, for the power applied against the pivot in the forward movement of the pawl being resisted both by the friction of the arm and the inertia of the wheel will cause the pivot to move outward toward the line $x\ x$, and will thereby straighten the toggle-joint and proportionately increase the pressure of the arm $m$ against the bar. The engagement of the pawl-tooth $t$ with the wheel will thus be the more strongly enforced as the rapidity of its movement is increased, and the wheel will be thereby positively prevented from slipping forward in advance of the pawl. The movement of the pawl-arm E and pawl C is arrested when the proper stroke of the pawl is completed by means of a lug or stop, N, which is fixed on the bar M in position to engage the end of the arm E, as shown in Fig. 2. As the arm E strikes the stop N, the arm $m$ of the dog D is also brought into contact with an offset or stop, P, at the end of the bar M, whereby the pawl C is locked in its engagement with the toothed wheel, so as to positively prevent an independent forward movement of the wheel after the stroke of the pawl is completed, and as a reverse movement of the wheel is prevented by the pawl B the wheel is completely locked the moment the forward movement of the actuating-pawl ceases and until it is drawn back. As the pawl moves backward, its tooth $t$ will automatically slide out of the notches and over the teeth of the wheel A in the customary manner, as shown in Fig. 3, the dog D being free to turn upon its pivot, so as to allow its friction-arm to slide freely and without resistance over the curved face of the bar M.

It is evident that the contact of the pivoted pawl with the stop P at the end of its stroke will operate to lock the wheel independently of the spring L, and I contemplate the use of my invention in this simple form.

I claim as my invention—

1. The combination of the toothed wheel, the fixed friction-bar having a curved surface concentric with the wheel, the pawl-arm swinging upon the axis of the wheel as its pivotal center, the pawl pivoted to said arm to engage the wheel, the dog pivoted to said pawl to swing into frictional contact with the curved surface of the bar as the pawl moves forward, and a spring enforcing said contact, substantially in the manner and for the purpose herein set forth.

2. The combination of the toothed wheel, the fixed friction-bar having a curved surface concentric with the wheel, the pawl-arm swinging upon the axis of the wheel as its pivotal center, the pawl pivoted to said arm to engage the wheel, the dog pivoted to said pawl to swing into frictional contact with the curved surface of the bar as the pawl moves forward, a spring enforcing said contact, and fixed stops engaging the dog and the pawl-arm when the stroke of the latter is completed, substantially in the manner and for the purpose herein set forth.

In testimony whereof I have signed my name to this specification in the presence of two subscribing witnesses.

WILLIAM KOCH.

Witnesses:
 A. N. JESBERA,
 E. M. WATSON.